UNITED STATES PATENT OFFICE.

ARTHUR P. SMITH, OF PIPE STONE, MINNESOTA.

COMPOSITION OF MATTER TO BE USED IN SOLDERING.

SPECIFICATION forming part of Letters Patent No. 354,843, dated December 21, 1886.

Application filed October 23, 1886. Serial No. 217,031. (No specimens.)

*To all whom it may concern:*

Be it known that I, ARTHUR P. SMITH, of Pipe Stone, in the county of Pipe Stone and State of Minnesota, have invented a new and Improved Composition of Matter to be Used in Soldering, of which the following is a full, clear, and exact description.

The object of my invention is to provide a compound for use in soldering, by the use of which many of the objections to the fluxes in common use are avoided.

My invention consists of the following ingredients combined in the proportions stated, viz: I purify melted tallow by introducing into it powdered quicklime, and to every one part of this purified melted tallow one part of white wax is added. After the above ingredients have been thoroughly united by dissolution, to every three parts of the mixture I add one part of pulverized rosin and stir the mass constantly until the rosin is also well dissolved. The hot fluid is now poured into cooling-pans, from which it may be taken in a few minutes in the shape of hard and dry solid smooth cakes of wax, ready for instant use.

Soldering-wax thus prepared will stand the heat in any climate and not melt, unless brought in contact with the heated iron or in a pan over the fire.

In the use of this compound the workman simply runs the edge of the wax lightly but firmly along the line or against the place to be soldered, leaving a faint pencil-like mark. The moment the soldering-iron and hot solder are carried along this waxed line the solder will flow smoothly, unite freely, and form a clean, neat, and tight joint.

In the use of salts or acids, which my invention dispenses with, much danger is incurred by the workman, and also by the public, who buy canned goods soldered therewith, as the aforesaid salts and acids are poisonous, and one drop introduced in the fruits and other articles preserved in this manner may result seriously.

In the use of my wax no possible harm can result from handling the same, as it is free of all poisonous substances, and it cannot be dropped into the canned goods undergoing the last soldering process in sealing them up.

My wax also presents many advantages over the use of rosin, which must be sprinkled along the edges of the parts to be soldered. As the hot solder melts the rosin and forms a flux, a broad unsightly patch is had wherever the said rosin was thickly laid on, and as it is impossible to spread the rosin evenly an undulating line of solder is invariably obtained with streaks of yellow along the edge.

Having thus described my invention, what I claim as new, and desire to secure by Letters Patent, is—

The herein-described composition for soldering, which consists of melted tallow purified with quicklime, white wax, and rosin, substantially in the proportions specified.

ARTHUR P. SMITH.

Witnesses:
 ALEX. STERN,
 CHAS. W. EHMAN.